(12) United States Patent
Diener et al.

(10) Patent No.: US 7,157,066 B2
(45) Date of Patent: Jan. 2, 2007

(54) COMBUSTION PROCESS FOR SYNTHESIS OF CARBON NANOMATERIALS FROM LIQUID HYDROCARBON

(75) Inventors: Michael D. Diener, Denver, CO (US); J. Michael Alford, Lakewood, CO (US); James Nabity, Arvada, CO (US); Bradley D. Hitch, Golden, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 605 days.

(21) Appl. No.: 10/306,615

(22) Filed: Nov. 27, 2002

(65) Prior Publication Data

US 2003/0143151 A1    Jul. 31, 2003

Related U.S. Application Data

(60) Provisional application No. 60/337,750, filed on Dec. 5, 2001.

(51) Int. Cl.
*B01J 19/26* (2006.01)
*C01B 31/02* (2006.01)

(52) U.S. Cl. .............. 423/445 B; 423/447.1; 431/4; 431/126; 431/7; 977/842

(58) Field of Classification Search ............ 423/447.1, 423/445 B; 431/4, 126
See application file for complete search history.

(56) References Cited

U.S. PATENT DOCUMENTS

| 1,225,381 A | 5/1917 | Wedge |
| 3,199,573 A | 8/1965 | Flynn |
| 3,615,210 A | 10/1971 | Jordan et al. |
| 4,228,131 A | 10/1980 | Rothbuhr et al. ............ 422/156 |
| 4,250,145 A | 2/1981 | Pobst, Jr. et al. ............ 422/151 |
| 4,673,349 A | 6/1987 | Abe et al. ..................... 431/328 |
| 4,889,481 A | 12/1989 | Morris et al. ................ 431/328 |
| 5,069,882 A | 12/1991 | Jones, Jr. ..................... 422/150 |
| 5,188,806 A | 2/1993 | Kuehner et al. ............. 422/151 |
| 5,227,038 A | 7/1993 | Smalley et al. ............. 204/173 |
| 5,254,325 A | 10/1993 | Yamasaki et al. ........... 423/450 |
| 5,264,199 A | 11/1993 | Sakaue et al. ............ 423/449.1 |

(Continued)

FOREIGN PATENT DOCUMENTS

JP         05186209         7/1993

(Continued)

OTHER PUBLICATIONS

Bachmann et al. (1994), "The formation of $C_{60}$ and its precursors in naphthalene flames," Chem. Phys. Lett. 223:506-510.

(Continued)

*Primary Examiner*—Stuart L. Hendrickson
*Assistant Examiner*—Alvin T Raetzsch
(74) *Attorney, Agent, or Firm*—Greenlee, Winner and Sullivan, P.C.

(57) ABSTRACT

The present invention provides a combustion apparatus for the production of carbon nanomaterials including fullerenes and fullerenic soot. Most generally the combustion apparatus comprises one or more inlets for introducing an oxygen-containing gas and a hydrocarbon fuel gas in the combustion system such that a flame can be established from the mixed gases, a droplet delivery apparatus for introducing droplets of a liquid hydrocarbon feedstock into the flame, and a collector apparatus for collecting condensable products containing carbon nanomaterials that are generated in the combustion system. The combustion system optionally has a reaction zone downstream of the flame. If this reaction zone is present the hydrocarbon feedstock can be introduced into the flame, the reaction zone or both.

21 Claims, 2 Drawing Sheets

U.S. PATENT DOCUMENTS

| | | | |
|---|---|---|---|
| 5,273,729 A | 12/1993 | Howard et al. | 423/445 |
| 5,300,203 A | 4/1994 | Smalley | 204/157.41 |
| 5,364,182 A | 11/1994 | Hawkins | |
| 5,470,222 A | 11/1995 | Holowczak et al. | 431/7 |
| 5,651,945 A | 7/1997 | Vogel et al. | 422/151 |
| 5,876,683 A | 3/1999 | Glumac et al. | 423/325 |
| 5,876,684 A | 3/1999 | Withers et al. | 423/445 B |
| 5,984,997 A | 11/1999 | Bickmore et al. | 75/343 |
| 5,985,232 A | 11/1999 | Howard et al. | 423/447.3 |
| 6,096,284 A | 8/2000 | Kanamaru et al. | 423/450 |
| 6,099,696 A | 8/2000 | Schwob et al. | |
| 6,099,818 A | 8/2000 | Freund et al. | 423/449 |
| 6,132,653 A | 10/2000 | Hunt et al. | 264/5 |
| 6,162,411 A | 12/2000 | Howard et al. | 423/445 B |
| 6,251,983 B1 | 6/2001 | Vogler et al. | 524/496 |
| 2002/0104596 A1 | 8/2002 | Crafton et al. | |

FOREIGN PATENT DOCUMENTS

| | | |
|---|---|---|
| JP | 6507879 T | 9/1994 |
| JP | 9505551 T | 6/1997 |
| JP | 03221216 | 5/2003 |
| WO | 9220622 | 11/1992 |

OTHER PUBLICATIONS

Bogdanov, A.A. et al. (May 2000), "Development Prospects of the Commercial Production of Fullerenes," Tech. Phys. 45(5):521-527.

Curl et al. (Oct. 1991), "Fullerenes," Sci. Am. pp. 54-63.

Diederich et al. (1991), "The Higher Fullerenes: Isolation and Characterization of $C_{76}$, $C_{84}$, $C_{90}$, $C_{94}$, and $C_{70}O$, and Oxide of $D_{5h}$—$C_{70}$," Science 252:548-551.

Diener, M.D. et al. (Sep. 2000—web published), "Synthesis of Single-Walled Carbon Nanotubes in Flames," J. Phys. Chem. B 104:9615-9620.

Gerhard, P. et al. (1987), "Polyhedral Carbon Ions in Flames," Chem. Phys. Lett. 137:306.

Hebgen, P. and Howard, J.B. (1999), "Synthesis of Fullerenes in Low Pressure Benzene/Oxygen Diffusion Flames," Fifth Int'l Microgravity Combustion Workshop, K.R. Sachsteder and J.S. T'ien (eds.) NASA/CP 1999-208917, pp. 137-140.

Homann, K.-H. (1998), "Fullerenes and Soot Formation—New Pathways to Large Particles in Flames," Angew, Chem. Int. Ed. 37:2434-2451.

Howard et al. (1991), "Fullerenes $C_{60}$ and $C_{70}$ in flames," Nature 352:139-141.

Howard et al. (1992), "Production of $C_{60}$ and $C_{70}$ Fullerenes in Benzene-Oxygen Flames," J. Phys. Chem. 96:6657-6662.

Howard et al. (1992), "Fullerenes Synthesis in Combustion," Carbon 30:1183-1201.

Jenkins, G.M. et al. (1998), "Continuous Production of fullerenes by Pyrolysis of Acetylene at a Glassy Carbon Surface," Carbon 36(12):1725-1727.

Krätschmer et al. (1990), "Solid $C_{60}$: a new form of carbon," Nature 347:354-358.

McKinnon et al. (1992), "Combustion Synthesis of Fullerenes," Comb. Flame 88:102-112.

Taylor et al. (1993), "Formation of $C_{60}$ by pyrolysis of naphthalene," Nature 366:728-731.

Zhang et al. (1999), "Laser Ablation Mass Spectrometry of Pyrolyzed Koppers Coal-Tar Pitch: A Precursor of Fullerenes and Metallofullerenes," J. Phys. Chem. B 103:9450-9458.

Ahrens, J. et al. (1994), "Fullerenes and their ions in hydrocarbon flames," Int. J. Mass Spectrom. Ion Process. 138:133-148.

Dobbins, R.A. et al., "The Evolution of Soot Precursor Particles in a Diffusion Flame," "Combustion and Flame" 115:285-298 (1998).

COMBUSTION PROCESS FOR SYNTHESIS OF CARBON NANOMATERIALS FROM LIQUID HYDROCARBON

CROSS-REFERENCE TO RELATED APPLICATIONS

This application takes priority under 35 U.S.C. 119(e) from U.S. provisional application No. 60/337,750, filed Dec. 5, 2001.

STATEMENT REGARDING FEDERALLY SPONSORED RESEARCH OR DEVELOPMENT

This invention was made with government support from the U.S. Department of Energy under SBIR grant number DE-FG03-98ER82692. The United States government has certain rights in this invention.

BACKGROUND OF THE INVENTION

The invention relates to the production of carbon nanomaterials including fullerenes in sooting flames, and in particular to burners, combustion apparatus, and methods for carbon nanomaterial production. More specifically the invention relates to combustion apparatus and method of combustion for production of carbon nanomaterials in which a liquid hydrocarbon feedstock is introduced into a flame in the form of droplets, e.g., by spraying.

The term "carbon nanomaterials" is used generally herein to refer to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, fullerenes, single-walled carbon nanotubes (SWNTs), multiple-walled carbon nanotubes (MWNTs), nanotubules, and nested carbon structures with dimensions on the order of nanometers. The term "fullerene" is used generally herein to refer to any closed cage carbon compound containing both six- and five-member carbon rings independent of size and is intended to include the abundant lower molecular weight $C_{60}$ and $C_{70}$ fullerenes, larger known fullerenes including $C_{74}$, $C_{76}$, $C_{78}$, $C_{80}$, $C_{84}$ and higher molecular weight fullerenes $C_{2N}$ where N is 43 or more. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$. In certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The methods and apparatus of this invention can be used to prepare condensables including soot that contain carbon nanomaterials and can be used in particular to prepare fullerenes and fullerenic soot. The apparatus of this invention is typically run at sub-ambient pressures and as such is particularly useful for the synthesis of carbon nanomaterials that are preferably formed under sub-ambient pressures, e.g., fullerenes and fullerenic soot.

Carbon nanomaterials have been proposed for a variety of application. Fullerenes and fullerenic soot can be employed, for example, as additives to electron- and photo-resists for semiconductor processing; in proton-conducting membranes for fuel cells, as optical limiting materials, in lithium battery anodes; as active elements in organic transistors; as pigments in cosmetics; as antioxidants; and as therapeutics, e.g., as anti-viral agents.

While the art recognizes significant potential for commercial application of carbon nanomaterials, and particularly for fullerenes, SWNTs and MWNTs, the high costs of synthesis of and the difficulties in obtaining these materials in the large amounts necessary for developing these applications has been a major impediment to practical application of these materials. There is a significant need in the art for improved methods and apparatus for making carbon nanomaterials, including fullerenes, in sooting flames that can lower the cost of production and provides these materials in sufficient quantities for practical application.

Sooting flames are currently the most cost-effective way to produce carbon nanomaterials at high production rates (preferably greater than about 100 g/day). This invention relates to improved methods for synthesizing carbon nanomaterials by combustion methods employing sooting flames.

It is known in the art that special fuels and combustion conditions are required for production of substantial amounts of fullerenes and other carbon nanomaterials relative to soot. During normal or industrial combustion the formation of fullerenes relative to soot is so low that these materials can only be detected with the most sensitive analytical techniques (K.-H. Homann, Angew. Chem. Int. Ed. 1998, 37, 2434–2451). Burner design is one of the variables that must be optimized to provide efficiency and acceptable rate of fullerene production (A. A. Bogdanov et al, Technical Physics, Vol. 45, No. 5, 2000, pp. 521–527). This invention relates to improved burner designs particularly adapted for use with lower volatility aromatic hydrocarbon feedstocks which facilitate the production of enhanced levels of carbon nanomaterials.

Fullerenes have been synthesized in premixed flames stabilized on a water-cooled flat metal plate (cooled burner) (Howard et al., U.S. Pat. No. 5,273,729). The device reported employs a burner having a porous burner plate forming the outlet for gases from the burner. The burner plate is water-cooled to prevent the ignition of the fuel-oxidizer mixture in the burner and to stabilize the flame. As the gas velocity through the burner is increased, the flame front tends to move away from the burner surface which can result in flame instability (i.e., the flame can be extinguished). Cooling of the burner plate promotes heat loss from the burner surface causing the flame front to move back towards the burner surface.

However, cooling of the burner surface promotes deposit formation on that surface which can result in irregularities in gas flow, which lead to inhomogeneities in the flame, and can adversely affect the material production yield and homogeneity. When the burner surface becomes coated with deposits, the synthetic process must be stopped to clean the burner. Efficiency of synthesis decreases and the costs of synthesis increase when processing must be interrupted frequently to clean the burners.

U.S. patent application Ser. No. 10/098,829, filed Mar. 15, 2002, reports the use of a burner for production of carbon nanomaterials in which the burner plate does not require cooling to maintain flame stability. This burner can operate at higher temperatures decreasing the rate of buildup of deposits on the burner plate so that the burner needs to be cleaned less often. Further, it is more efficient to operate an uncooled burner, which can heat gas flows, raising flame temperature without significant heat loss due to cooling the burner plate. The burner described in this patent application employs porous refractory material as the burner plate. In addition, the burner plenum is optionally provided with temperature control, e.g. a liquid jacket for heating or cooling, to facilitate burner operation.

Another advantage of avoiding cooling of the burner surface is the ability to introduce lower vapor pressure additives and or fuels or feedstocks into the flame as gases while avoiding condensation in the burner. One example of such additives are high-boiling (lower volatility) PAH rich feedstocks that serve as cost-effective, high-yield feeds for fullerene production, such as those described in U.S patent application Ser. No. 10/099,095, filed Mar. 15, 2002. Another example is catalysts that sublime at elevated temperatures, easing their incorporation into the feed stream.

High temperature surface burners for use in other applications such as industrial furnaces are known. For example, Abe et al., U.S. Pat. No. 4,673,349 describe a high temperature surface combustion burner which uses a burner plate made of a porous ceramic body. In both embodiments of the invention reported, the porous ceramic body contains throughholes. U.S. Pat. No. 4,889,481 to Morris et al. reports a dual structure porous ceramic burner plate for use as an infrared burner. U.S. Pat. No. 5,470,222 to Holowczack et al. reports a high emissivity porous ceramic flame holder for use in a heating unit.

U.S. Pat. No. 5,876,684 (Withers, J. C. and R. O. Loutfy) reports a process for feeding graphite powder into a flame created on a water-cooled burner. U.S. Pat. No. 5,985,232 (Howard et al) speculates that other types of flames and other types of burners could be used to produce fullerenes, but gives no examples of such burners, no procedures for burner operation and flame generation, and no results from any burner other than a premixed water-cooled flat plate burner.

Carbon black can be produced by spraying a liquid hydrocarbon into a natural gas flame. Carbon black reactors such as those described in U.S. Pat. Nos. 4,228,131; 4,250, 145; 5,069,882; 5,188,806; 5,254,325; 5,264,199; 5,651, 945; 6,096,284; 6,099,818 are operated at ambient or near-ambient pressure. In contrast, carbon nanomaterials synthesis is run at sub-ambient pressures. Carbon black reactors have been found to make only ppm-level quantities of fullerenes. Typically, in carbon black reactors droplets of hydrocarbons and hot combustion gases can be mixed in a turbulence-inducing venturi in the gas flow path. This method of mixing is not easily available for the production of fullerenes and fullerenic soot because it is difficult to create turbulence at the low pressures required for fullerene formation in combustion systems. Only trace (ppm) levels of fullerenes have been identified in the products of carbon black processes.

SUMMARY OF THE INVENTION

The present invention provides a combustion apparatus for the production of carbon nanomaterials including fullerenes and fullerenic soot. Most generally the combustion apparatus comprises one or more inlets for introducing an oxygen-containing gas and a hydrocarbon fuel gas in the combustion system such that a flame can be established from the mixed gases, a droplet delivery apparatus for introducing droplets of a liquid hydrocarbon feedstock into the flame, and a collector apparatus for collecting condensable products containing carbon nanomaterials that are generated in the combustion system. The combustion system optionally has a reaction zone downstream of the flame. If this reaction zone is present the hydrocarbon feedstock can be introduced into the flame, the reaction zone or both.

The flame may simply be established (by ignition) from oxygen-containing gas and fuel gas introduced through the one or more inlets. Hydrocarbon fuels can, for example, be burned in a premixed flame or a diffusion flame. The flame may be established at a burner surface after introduction of these gases through the burner. The burner may be a premixed burner or a diffusion burner. The burner may have a plenum for introduction and mixing of gases.

In general any apparatus or device that can be used to generate liquid droplets can be employed as the droplet delivery apparatus, for example, spray nozzles and piezo-electric droplet generators can be employed. The liquid hydrocarbon droplets can be provided in any type of droplet distribution. The term spray is used generally herein for all droplet distributions and droplet sizes and includes, among others, sprays, mists, fogs and atomized sprays.

In a specific embodiment, the combustion apparatus comprises a burner for establishing a flame by combustion of an oxygen-containing gas (e.g., air or oxygen) in the presence of a hydrocarbon fuel (e.g., a light hydrocarbon, such as methane or natural gas) in combination with one or more inlets for introducing droplets of a hydrocarbon feedstock, preferably a feedstock containing aromatic constituents, into the flame or a reaction region downstream of the flame. After its introduction, the feedstock is combusted, pyrolyzed or both under conditions (temperatures, pressures and residence times) in which carbon nanomaterials, particularly fullerenes, are generated at greater than trace levels (greater than 10 ppm).

The flames generated by burners of this invention can be near stoichiometric and preferably non-sooting; however, when the introduced hydrocarbon feedstock is accounted for, the flame preferably becomes fuel-rich and strongly sooting. Also, a portion of the sprayed or injected hydrocarbon feedstock may be burned to generate more heat and assist in the conversion of the remaining feedstock to fullerenes or other carbon nanomaterials. Additional gas may be added with the hydrocarbon feedstock, e.g., through a liquid injector nozzle, to facilitate the breakup of the feedstock droplets. If the additional nozzle gas is an oxygen-containing gas, then it will also assist in heating the feedstock by improving the mixing between the oxidizing gas and the portion of the feedstock that is to be combusted. As a consequence of introduction of an oxygen-containing gas along with the hydrocarbon feedstock, the combustion gases exiting the reaction region may have a non-equilibrium composition.

This invention also comprises a method for producing carbon nanomaterials in sufficiently large amounts to generate practical amounts of such materials. For example methods of this invention can be used to generate about 5% by weight or more of extractable fullerenes in collected soot, particularly from simple aromatic feedstocks such as toluene. In preferred embodiments methods of this invention can be used to generate about 8% or more of extractable fullerenes and in more preferred embodiments about 10% or more by weight of extractable fullerenes. The method of this invention comprises providing a flame generated by burning a hydrocarbon fuel, particularly a light hydrocarbon, such as methane (or natural gas) and spraying or injecting droplets of a hydrocarbon feedstock into the flame or into a reaction region upstream of the flame such that the feedstock is burned, pyrolyzed or both such that carbon nanomaterials are formed.

The kinetics of fullerene formation are improved when the sprayed hydrocarbon feedstock contains at least one aromatic ring. Hydrocarbon feedstocks for spraying or injection preferably contain aromatic components that comprise one or more aromatic rings and more preferably contain poly nuclear aromatic hydrocarbons (PAHs) having two or more aromatic rings. High boiling feedstocks which can be readily sprayed or injected into the combustion system in liquid form for burning or pyrolysis are preferred. There is no need in this combustion system for volatilizing the feedstock prior to its spraying or injection. It may be desirable to control the temperature (by heating or cooling, for example with a liquid jacket) of the injector or spray inlet(s) to facilitate spraying or injection of liquid.

The flame is generated preferably at the surface of a burner by burning of a light hydrocarbon (lower molecular weight hydrocarbons, e.g., C1–C6 hydrocarbons). The combustion system herein operates by generating liquid droplets of feedstock in the flame or in a reaction region in thermal communication with and downstream of the flame. Liquid droplets of feedstock can be generated by spraying, injecting or other means of generating liquid droplets. The flow of gases to form the flame is controlled separately from the flow of feedstock (as droplets) into the combustion system. As a result, the burning or pyrolysis of droplets of feedstock to form fullerenes and other carbon nanomaterials is substantially independent of flame stability. Flame stability can be maintained substantially by adjusting the flow rates and relative amounts of oxygen-containing gas and fuel (e.g., light hydrocarbon) to the burner. This allows a wider variety of chemical compositions to be achieved in the flame as well as a wider range of time-temperature histories to be achieved for any specific chemical composition.

The burner of this invention may be of any design, so long as it generates the heat necessary to convert the feedstock to carbon nanomaterials. Suitable burners include diffusion burners, with fuel and oxidizer flows parallel or opposed, including but not limited to one- and two-dimensional Wolfhard-Packer type burners. Suitable burners also include premixed burners, including Bunsen and flat flame burners. A particular burner suitable for this invention comprises a plenum (which may be temperature controlled, heated or cooled) and a porous refractory material between the plenum and the burner surface. The burner surface is typically formed by the porous refractory material. The burner surface at which the flame forms is preferably not cooled, though the plenum may be cooled. This type of burner provides for improved thermal management and improved efficiency. Since the downstream surface of the burner is hot, and a poor thermal conductor, little heat from the flame is lost to the burner. Indeed, the burner preheats the uncombusted fuel and oxidizer used in the flame. In a water-cooled burner, a significant portion of the heat generated by the flame is lost into the water cooling; nevertheless, a water-cooled burner is still capable of generating the necessary heat to convert the feedstock to carbon nanomaterials.

This invention uses a more economical hydrocarbon source (methane, natural gas or other light hydrocarbon) to generate heat (i.e., the flame) and also employs a more economical hydrocarbon feedstock for fullerene formation, a feedstock containing one or more aromatic hydrocarbon (toluenes, benzenes) or feedstocks containing one or more PAHs that do not volatilize readily. Because burning of the hydrocarbon fuel gas generates a large portion of heat in the combustion system, it is believed that a larger portion of the sprayed or injected feedstock is available for synthesis of fullerenes or other carbon nanomaterials.

Another advantage of the use of a combustion system of this invention with inlets for spraying or injection into the flame or reaction region is the ability to introduce low vapor pressure additives into the flame. When the additive is in a condensed phase at the maximum temperature at which a premixed burner can operate without detonating, the additive cannot be added as a gas through the burner. Non-water-cooled premixed burners have temperature limitations, because the hydrocarbon fuels start to soot in the burner as the temperature is raised. For droplet combustion, the situation is improved because the additive does not become a gas until the droplet evaporates in the flame environment. In this case, the heat from the flame is used to volatilize the additive and there is no high-temperature limitation from burner materials. Non-volatile catalysts can also be incorporated into the flame (or reaction region) simply by dispersing them in the hydrocarbon feedstock to be sprayed The combustion system of this invention is improved compared to premixed burners of the prior art by allowing the use of less expensive hydrocarbons (such as natural gas) for heat generation, and using more costly aromatic-containing hydrocarbon substantially for synthesis. As noted above, the combustion system of this invention does not require a system to vaporize the fuel before adding it to the burner. The highest conversion ratio from hydrocarbon to fullerenes that has been observed is achieved with polynuclear aromatic hydrocarbons (PAHs), but these feedstocks are also readily converted into large nonvolatile PAHs and other carbonaceous solids. Coking from PAHs is particularly severe at the elevated temperatures required to use them in a premixed burner. Once formed, these solid deposits can rapidly clog heated burners and plenums. Because low volatility feedstocks are injected or sprayed into the system rather than passing through the burner, the combustion system of this invention is improved and can be operated for longer times without stopping operation to clean the burner surface.

The invention provides improved burners, combustion apparatus, and methods for carbon nanomaterial production. The combustion system of the invention provides sooting flames of fuel and oxidizing gases. The condensable products of combustion produced by the system can contain, without limitation, soot, fullerenic soot, and fullerenes. The combustion system of the invention does not require premixing of the fuel and oxidizing gases and is suitable for use with low vapor pressure feedstocks such as those containing substantial amounts of polyaromatic hydrocarbons. The burners of this invention can operate and are preferably operated without cooling the burner plate surface and require little, if any, active cooling or other forms of heat sinking. The burners of the invention can also be operated to reduce the formation of undesirable soot deposits on the burner and on surfaces downstream of the burner.

In a specific embodiment, the invention provides a burner for carbon nanomaterial production with a porous refractory material forming the outlet of the burner plenum and providing the burner surface. The porous refractory material provides for uniformly distributing gas flow across the burner plate, stabilizing the flame at or near the surface of the burner, providing a thermal shield preventing flame propagation back into the plenum, and providing for preheating of the fuel and oxidizing gases prior to combustion. The porous refractory material can be formed from one or more layers of porous refractory material, e.g., one or more porous refractory plates. The porosity of the layers can be the same or different to provide for desirable thermal properties and gas permeation. The refractory material can also be formed by a layer of particles of refractory material. The size of the particles of refractory material and the thickness of the layer of particles (as well as the type of refractory material) are selected to achieve desired thermal properties and to function as a flame flashback arrestor. When a particulate refractory material is employed a holder to retain the particulates must be provided. For example, the refractory particle layer can be formed and or retained on a porous metal frit which allows passage of gases into the burner but retains the particles. For example, a hopper having a porous base and non-porous retaining walls can be provided to retain a layer of refractory particles. Suitable refractory materials include zirconia and alumina without limitation. The porous refractory may also be a mixture of porous refractory plates and particles. For example, a layer of particles on top of the plates reduces the thermal shock incurred during ignition and shutdown, reducing the likelihood of failure due to cracking.

If present, the burner plenum can be optionally heated or cooled, e.g., via a fluid jacket, to control the temperature of the fuel and oxidizing gases within the plenum, for example to prevent fuel condensation within the plenum, to preheat the gases, or prevent sintering in the metal frit.

The combustion apparatus of the invention incorporates one or more burners of the invention and can be employed to generate higher levels of fullerenes or other carbon nanomaterials in soot produced by combustion. The combustion apparatus of this invention comprises a reaction zone, a zone of the apparatus downstream of the burner where temperatures are preferably maintained between about 1000° C. and about 1400° C. Combustion or pyrolysis of feedstock and further reaction (e.g., condensation reactions) of combustion or pyrolysis products to form carbon nanomaterials can occur or continue in this reaction zone. The combustion system further comprises one or more inlets for spraying or injecting liquid droplets of fuel into one or more flames generated at one or more burners of the systems or into the reaction zone of the system.

In a preferred embodiment, a portion of the combustion apparatus downstream of the burner is insulated to better retain heat from the burner and to thereby maintain temperatures in the zone at levels that promote continued reaction to generate carbon nanomaterials. This insulated portion of the apparatus forms the reaction zone. Insulation of a portion of the combustion apparatus downstream of the burner functions to elongate the reaction zone, and thereby to extend the residence time of reacting materials at higher temperatures, enhancing the yield of carbon nanomaterials.

In another embodiment, additional oxidizer is supplied into the combustion apparatus along the walls of the apparatus including into the reaction zone and is preferably provided at the periphery of the porous refractory plate of the burner. The additional oxidizer decreases the formation of soot deposits on the porous refractory plate and on surfaces at the periphery of the reaction zone downstream of the burner.

In a specific embodiment, the liquid hydrocarbon is introduced into the combustion system in combination with a gas, which may be an oxygen-containing gas. The gas assists in decreasing the size of the droplets of hydrocarbon feedstock. If the gas is an oxygen-containing gas, it can facilitate combustion of the droplets, increasing the heat around the droplets.

Combustion synthesis of fullerenes and fullerenic soot is conducted at sub-ambient pressures (e.g., sub-atmospheric pressures), thus the combustion system has an appropriate vacuum housing and pumps for generating and maintaining sub-ambient pressures in the combustion system downstream of the burner plate (e.g., the burner surface and reaction region are maintained at sub-ambient pressures). The combustion apparatus is provided with a suitable pumping system to facilitate gas flow from the burner through the reaction zone and collection apparatus (discussed below) to a system exhaust. The pumping system provides for sub-ambient pressure downstream of the porous refractory plate.

The combustion apparatus is provided with a collection apparatus for collecting synthesized carbon nanomaterials. The collection apparatus can simply be one or more surfaces of the combustion apparatus upon which products condense for collection (e.g., by manual or automated scraping of the surfaces). Alternatively and preferred, the collection apparatus comprises a filtering device for capturing carbon nanomaterials which may contain one or more filters and a mechanism for releasing the captured products from the filter(s). For example, access can be provided into the combustion apparatus for release of products from the filter. Alternatively, when more than one filter is employed an apparatus for removing a filter from the flow of product gas can be provided to allow cleaning of the filter. Alternately and preferred, an apparatus for in situ release of collected products from a filter can be provided.

The invention also provides methods for making carbon nanomaterials employing the burners of this invention and the combustion apparatus of this invention. Carbon nanomaterials can be made either via a batch or continuous process.

DETAILED DESCRIPTION OF THE INVENTION

In the combustion system of this invention, flame stability conditions can be decoupled from the process of formation of carbon nanomaterials by first establishing a flame that may or may not operate fuel-rich, and then adding additional hydrocarbon. A wider variety of fuels, including those with low vapor pressures, can be used by introducing the hydrocarbon feedstock as a liquid into the flame. The hydrocarbon feedstock introduced breaks up into droplets, which evaporate and can at least partially burn. The addition of suitable spray injectors or other types of inlets or nozzles for introduction of feedstock droplets can be used with many types of burners. The liquid droplets may be introduced into the flame by any suitable apparatus, including nozzles, ultrasonic dispersers, and piezoelectric devices. The nozzle is most preferred, and may be vaned, impingement-type, air-atomizing, or electrostatic There are two exemplary geometries for droplet introduction: axial and radial. In axial injection, a spray nozzle is mounted on the axis of the burner, with the spray axis coincident with the axis of combustion gas flow. Droplet spray injectors typically form either hollow or full cone patterns of droplets. Off-axis injectors and injectors producing square or ellipsoidal droplets patterns can also be employed, but, it is preferred that the distribution of droplets generated by spraying or injecting match the heat distribution of the flame. If the flame generated at the burner has a symmetrical heat distribution over and extending from the burner plate or in the reaction zone, it is preferred that the sprayed or injected droplet distribution is symmetrical over and extending from the burner plate to within the reaction zone. The preferred matching of heat and feedstock distribution at the burner and in the reaction zone functions to increase efficiency of heating of the feedstock and its conversion into desired carbon nanomaterials. If there is an unsymmetrical distribution of heat over and extending from the burner plate or within the reaction zone, the distribution of feedstock droplets is preferably unsymmetrical substantially matching the heat distribution. Spray nozzles or injectors that place the hydrocarbon feedstock most uniformly throughout the heat generated by the flame are preferred for enhanced product yield. Axial injection is illustrated in FIGS. 1 and 2.

Figure 1:
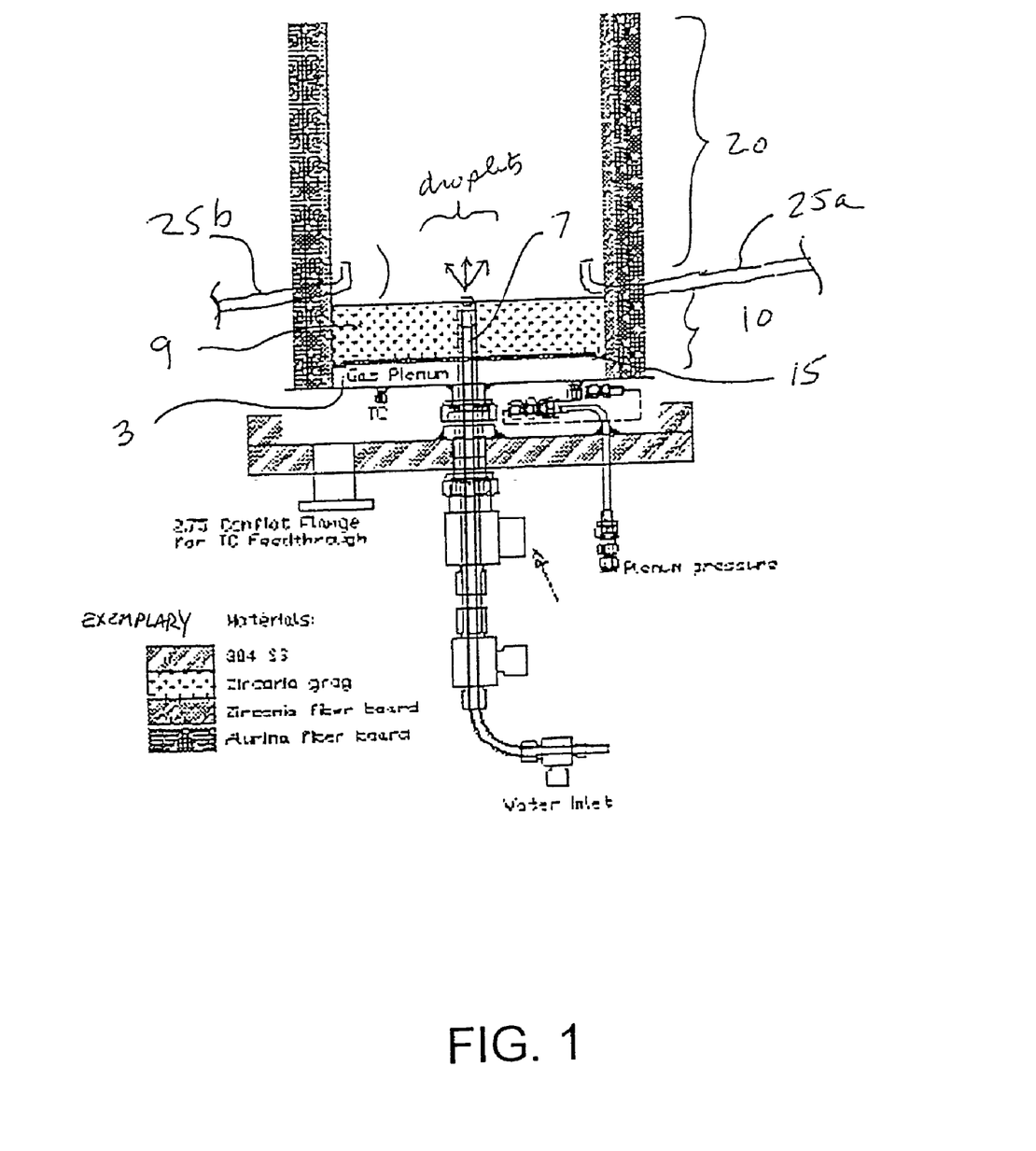
FIG. 1 is a schematic diagram of a burner of this invention illustrating an axial spray inlet for introduction of feedstock into the flame or reaction zone of the combustion system.

FIG. 1 illustrates (in cross section) a burner (10) of this invention and the reaction zone (20) downstream of the burner that are useful in combustion systems herein. The combustion system downstream of the burner plate is maintained at sub-ambient pressure by a suitable pumping system (not shown). The burner has a plenum (3) and refractory material (9) between the plenum and the burner surface. The refractory material forms the burner surface (11). FIG. 1 also illustrated an axially positioned spray injector (7) for introducing droplets of feedstock into the system. A porous metal frit (shown as dotted line 15) supports and or retains the refractory material. The spray injector is connected to an inlet with valves and metering devices for controlling the flow of feedstock to the injector. The inlet and injector may be heated (or cooled) to facilitate liquid transport through the injector. One or more inlets are provided for the introduction and control of the flow of fuel and oxygen containing gas into the burner plenum. In line mixing devices may be employed in these inlets. The burner plenum is optionally temperature controlled (for example employing a liquid jacket to heat or cool or employing heating tape to heat) to facilitate passage of fuel and oxidizing gas into the burner. Also illustrated schematically are inlets (25a and 25b) into the reaction zone for addition of a secondary oxidizing gas (e.g., air).

Figure 2:
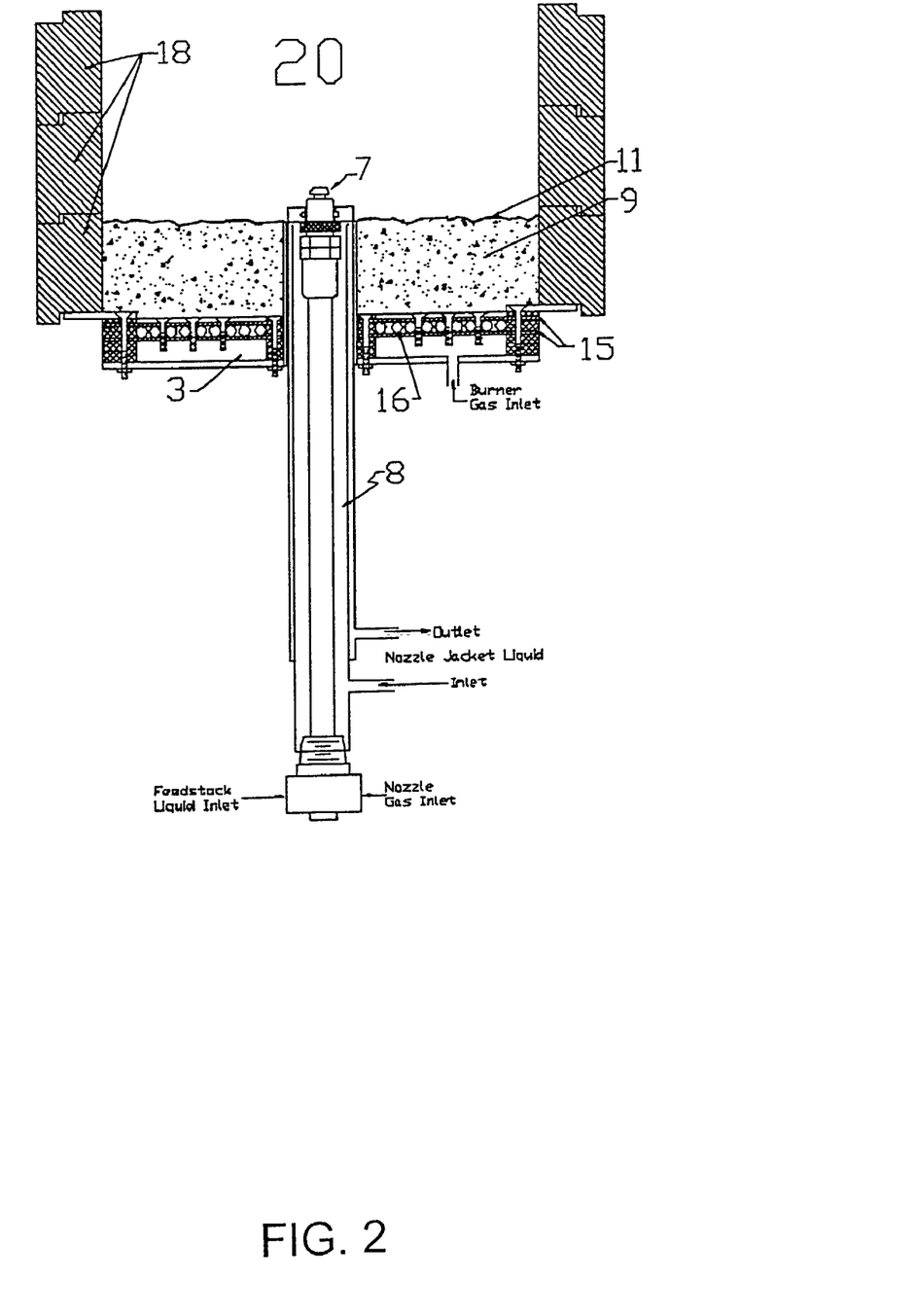
FIG. 2 is a schematic diagram of another burner of this invention illustrating an axial spray inlet for introduction of liquid feedstock into the flame or reaction zone of the combustion system, the spray also incorporating an additional gas, and the burner plenum being temperature-controlled by a liquid.

FIG. 2 illustrates (in cross section) a burner (10) of this invention and the reaction zone (20) downstream of the burner that are useful in combustion systems herein. The reaction zone is extended downstream of the burner surface by the refractory (18). The combustion system downstream of the burner plate is maintained at sub-ambient pressure by a suitable pumping system (not shown). The burner has a plenum (3) and refractory material (9) between the plenum and the burner surface. The refractory material forms the burner surface (11). FIG. 2 also illustrates an axially positioned spray injector (7) for introducing droplets of feedstock into the system. Porous metal frits (15) support and/or retain the refractory material. Coils (16) for liquid flow to regulate the temperature of the frits are shown sandwiched between the frits. The spray injector is connected to an inlet with valves and metering devices for controlling the flow of liquid feedstock and gas to the injector. The inlet and injector may be heated (or cooled) to facilitate liquid transport through the injector. One or more inlets are provided for the introduction and control of the flow of fuel and oxygen-containing gas into the burner plenum. In line mixing devices may be employed in these inlets. The injector nozzle is temperature controlled by a liquid jacket [8] to heat or cool to facilitate passage of liquid fuel and gas through the nozzle.

The combustion system of this invention can also employ radial spraying or injection of feedstock where the liquid feedstock is introduced from a plurality of injectors preferably positioned around the circumference of the flame and/or around the reaction zone. Radial spray geometry is commonly used in full-size carbon black plants, where a single axial sprayer does not distribute the hydrocarbon droplets in the large flame as well as many smaller sprayers. In smaller units with less circumference, the volumetric spray through each radially located injector is small, requiring the orifice size of the injectors to be prohibitively small to create droplets that are small enough to form fullerenes. The number of injectors varies with the diameter of the flame and the spray penetration distance. Again, the optimum geometry is one which places the hydrocarbon most evenly throughout the heat generated by the flame. In cases where more than one injector or spray nozzle is employed each injector or nozzle can be the same or different in length, orifice size or shape, and internal structure. Each injector or spray nozzle is in fluid communication with a source of feedstock. In a specific embodiment, feedstock can be pumped through the injector(s) or spray nozzle(s) or other droplet delivery conduit(s) to generated a desired flow of droplets into the system. The flow through the one or more injectors, nozzles or other droplet delivery devices can be independently controlled or any one or more may be controlled in concert. Any suitable apparatus, including nozzles, ultrasonic dispersers, and piezoelectric devices can be used to delivery droplets of liquid hydrocarbons feedstock to the flame and/or the reaction zone. The nozzle is most preferred, and may be vaned, impingement-type, air-atomizing, or electrostatic The droplet size distribution is relevant to selecting the correct ratio of hydrocarbon feed rate to the rate of heat generation in the flame. Various spray nozzles have various droplet size distributions, which are in turn a function of such parameters as hydrocarbon viscosity and upstream pressure. It is a characteristic of these distributions that, though there are many more small droplets, most of the hydrocarbon volume is contained in the few largest droplets. Therefore, one must take into account the spatial distribution of the hydrocarbon volume, in addition to the droplet number distribution in the control of injection or spraying of hydrocarbon feedstock A flame environment that allows all of the hydrocarbon that is to be converted into carbon nanomaterials to have a uniform time-temperature history is preferred for optimum production In general, the droplet size can be reduced by forcing a gas through the spray nozzle along with the liquid hydrocarbon feedstock. This type of nozzle is sometimes known as "air atomizing," "air assist," or "effervescent." In addition to decreasing droplet size, it affords an opportunity to intimately mix the liquid hydrocarbon with an oxygen-containing gas, which is advantageous when burning some of the droplets to generate additional heat is desired. FIG. 2 shows a nozzle suitable for this manner of operation.

Higher yields of carbon nanomaterials can be obtained by generally matching the radial flow distribution of the burner (and thus the radial heat distribution) from the burner to the radial distribution of hydrocarbon feedstock volume. The largest feedstock droplets, containing most of the hydrocarbon that is sprayed into the system, take the longest to evaporate, and therefore travel furthest, placing the injected feedstock away from the axis. However, the angular distribution of the largest droplets is not necessarily uniform—e.g. there may be more large droplets near the axis than at greatly deflected angles. This distribution of feedstock droplets around the spray or injector device is partially a function of the upstream pressure of the hydrocarbon feedstock. Should there be more hydrocarbon volume closer to the axis than towards the edge of the flame, the system can still be optimized by setting up the flow through the burner to be unevenly distributed, that is, more flow in the burner through the middle than at the edge. Therefore, the heat and the hydrocarbon spray droplet location stay matched, even when they are not spatially uniform, thereby ensuring an isothermal reaction zone.

The heat distribution and gas velocity is illustrated as substantially uniform across the surface of the burner of FIG. 1, making a similarly uniform distribution of hydrocarbon feedstock volume desirable. Furthermore, we believe that it requires one millisecond or more to form a fullerene at ~1200° C., and that the time to evaporate a droplet should be ~$1/10^{th}$ of the fullerene formation time. The latter criterion sets the droplet size to ~10 microns (Sauter mean; volume mean=35 microns) in a hydrocarbon-oxygen flame, just barely achievable by the smallest commercially available impingement spray nozzles. For the axial injection shown in FIG. 1, a wide-angle spray pattern is most desirable as it mitigates the temperature drop along the axis associated with the fuel vaporization.

While some fullerenes will be formed from almost any hydrocarbon, the fullerene yield has a strong dependence on the hydrocarbon feedstock that is introduced. PAHs, as found prominently in coal tar distillates, are favorable for fullerene formation. The spray or injection feedstock is not limited to PAH-containing fuels, but also includes single-ring aromatic fuels, such as toluene. Less desirable feedstocks are hydrocarbon mixtures that have a high percentage of alkanes. However, feedstock suitable for use in this invention contains substantial amounts of PAHs. Suitable feedstocks include coal tar distillate fractions and petroleum distillate fractions (or combinations of such fractions) among many others.

Liquid hydrocarbon feedstocks useful in this invention include those which comprise one or more aromatic components that have at least one aromatic ring. Preferred hydrocarbon fuels, particularly for fullerene synthesis, comprise a substantial amount (i.e., about 30% or more by weight) of polynuclear aromatic hydrocarbons (PAHs). Various sources of PAH feedstocks are available. Useful sources of hydrocarbon feedstock include coal-tar distillate fractions, petroleum distillate fractions particularly petroleum solvent naphtha fractions, including those boiling in the range about 160°–210° C. (at about atmospheric pressure) and coal tar distillates containing one or more fractions collected over the temperature range 100° C. to about 220° C. (at about atmospheric pressure) and particularly coal tar distillate containing one or more fractions collected over the temperature range about 120° C. to 200° C. (at about atmospheric pressure). Hydrocarbon feedstocks of this invention also include liquid hydrocarbons that contain indene in combination with one or more of benzene, toluene, xylene, naphthalene, anthracene, phenanthrene, indan or creosols.

The fuel and oxidizing gases can be supplied premixed to the burner of FIG. 1, alternatively mixing can occur within the burner. In particular, the burner plenum optionally contains a static mixer upstream of the refractory plate in order to mix the fuel and oxidizing gases prior to their flow through the refractory plate to generate the flame. The static mixer in the plenum can be combined with the fluid jacket around the plenum to better control the temperature at which the mixing of the fuel and oxidizing gases occurs. Static mixers suitable for use with the invention are known to the art and are commercially available, for example from (Coflo Inc.). Mixing can simply be provided by introducing baffles or other protrusions into the conduit leading to the plenum or into the plenum itself. A porous metal plate placed upstream of the porous refractory plate can also distribute the fuel and oxidizing gases evenly across the refractory. The porous metal plate can have a pore size typical of porous metal plates used in gas diffusion mixers, which is on the order of 1 to 50 microns. In addition, passage of the fuel and oxidizer gases through the porous refractory can further provide for some additional mixing and gas distribution.

The burner of FIG. 1 consists of at least two parts: a plenum in which the premixed oxygen and light hydrocarbon enter and porous refractory downstream of the plenum to serve as a thermal barrier between the flame and the premixed, but not ignited gases. The porous refractory may be either fritted or particulate in nature. If particulate refractory is used, there must be a hopper to contain the particulate. The hopper may be formed from the refractory insulation that lines the outer circumference of the reaction zone downstream of the burner surface. Suitable choices for refractory are zirconia and alumina. Grog is an economical choice of particulate, although grinding spheres are also suitable. If refractory particles are employed, the size of the particulate should be chosen to be small enough that it serves as a flame flashback arrestor; that is, the cavities between the particulate are smaller than the quench distance of the flame. However, the particulates should not be so small so as to fluidize in the gas flow. Zirconia grog having about 5 mm diameter works in a 10" diameter burner with cold gas flows between 40 and 200 SLPM. Parameters for fritted thermal barriers in burners are described in U.S. patent application Ser. No. 10/098,829, filed Mar. 15, 2002. The bottom of the hopper for the particulate refractory can be a metal frit, as described in FIG. 1. The metal frit has 10 micron pores, producing a pressure drop of ca. 30–120 torr, according to gas flow. Many other pore sizes will work equally well, certainly including 5–50 microns.

A third item, cooling to the sides of the burner or between the burner frits (as shown in FIG. 2) to maintain the temperature of the plenum below the ignition point of the premixed gases, may be added to reduce the necessary thickness of the refractory, or to allow operation at with lower cold gas fluxes through the refractory. (The cold gases flowing through the refractory provide the primary means of cooling the metal frit; less gas flow, greater need for another source of cooling.) Fluids suitable for use in a heating/cooling fluid jacket include the feedstock itself, water and propylene glycol. Other means for heating the plenum (electrical heaters) and for cooling the plenum (refrigeration devices, electrical coolers) can also be employed if desired.

In the Figures, the reaction zone is illustrated as being formed by the positioning of one or more walls (5) of refractory material or other thermally insulating material to extend the hot ($\geq 1000°$ C.) reaction zone downstream of the burner. The length of the reaction zone and the gas flow in the systems can be adjusted to achieve a desired residence time for feedstock or feedstock products in the reaction zone. Residence time is typically adjusted to optimize for generation of a selected carbon nanomaterial product. For example, residence time can be adjusted in a given system with a given reaction zone and droplet injection device by varying the gas flow rate in the system. Residence time will also depend upon the rate of droplet injection into the system which in turn may depend upon the geometry of the spray nozzle or injector. Preferably the residence time in the reaction zone for a species generated in or near the flame should be at least about one millisecond, and is preferably 5 to 10 milliseconds or longer.

The porous refractory can be made of any refractory material that does not melt under its radiative heat load, including carbon and ceramics such as zirconia, alumina, and cordierite. Zirconia offers good stability, but is more expensive than alumina. Zirconia plates one to one and one half inches thick with about 30–50 pores per inch, a pore size of 300–800 microns, and factory sealed edges are suitable for use in the burners of the invention. The zirconia plates were obtained from Vesuvius Hi Tec, Alfred, N.Y. It is preferred in general (for gas distribution) that the porosity not be in the form of through holes. The downstream surface of the porous refractory burner plate is designed to remain hot during operation. A hot burner plate surface does not need to be cooled to prevent its melting, sublimation, or decomposition under the heat load incident on it from the flame. The hot burner surface needs to be capable of withstanding temperatures in excess of at least 1000° C.

The refractory plates or particulate hopper can be in any cross-sectional shape, including circular, hexagonal, or square. Preferably, the sides of the porous refractory are sealed to eliminate gas flow out the sides. If multiple porous refractory plates are used, they can have different compositions and/or porosity characteristics. The optimal number of porous refractory plates will depend on the plate material, porosity, and thickness, as well as the desired rate of gas flow through the reactor.

The pore size and volume percentage of porosity of the burner plate can vary over a very wide range without significant impact on carbon nanomaterial production. If the burner plate is composed of multiple porous refractory plates, then each plate can have different porosity characteristics. For example, a relatively thin refractory plate with a relatively small pore size and porosity may used to provide sufficient pressure drop for flow distribution while relatively thick plates with a relatively large pore size and porosity can be used as thermal shields. A thin (⅛"–¼") metal frit with a relatively small pore size (5–50 microns) and porosity can also be used to provide sufficient pressure drop for flow distribution when used upstream of porous refractory plates acting as thermal shields. Upstream and downstream are defined with respect to the overall direction of fuel and oxidizer flow through the burner.

Similarly, different layers of particulate refractory with different particle sizes can be used. Particulate size can vary widely with impacting carbon nanomaterial production. Also, the radial distribution of particulate size can vary, to force slightly more gas flow through the region with larger particulates. In general, the required porosity characteristics depend upon the thickness and chemical identity of the porous refractory. The refractory must be sufficiently porous that the fuel and the oxidizer flow per surface area unit rates will sustain a flame. It is also desirable that the porosity characteristics are such that the fuel and oxidizer gases upstream of the burner plate are sufficiently mixed to ignite.

If the gases are sufficiently mixed upstream of the burner plate, the pore size of the refractory is selected to be less than the quench distance for the flame to prevent ignition of the gases on the upstream face of the burner plate. When the pore size exceeds the quench distance, a flame can exist within the refractory and can work its way back upstream until the upstream surface of the burner plate is hot enough to ignite the premixed gases. Since the quench distance is related to the pressure, the upper limit on pore size also varies with the pressure. Prevention of ignition on the upstream face of the burner plate also depends on the burner plate material(s) and its thickness. The refractory pore size and thickness of the refractory are chosen so that sufficient temperature gradient is present across the refractory to prevent ignition on the upstream face of the refractory.

The refractory material when employed in the form of plates is sealed to the burner employing art-known techniques. The plenum is preferably sealed to the upstream face of the refractory plate or the metal frit with a high temperature flexible seal. If multiple refractory plates are used, the outer edge of the joints between the plates is also preferably sealed with a high temperature flexible seal. Suitable flexible seals include room temperature vulcanized (RTV) silicone adhesive sealing compounds, epoxy, or other sealing compounds known to those in the art. Cooling can be provided as necessary to prevent the seal material from exceeding its preferred use temperature. The high temperature flexible seal material can also covered by a harder or tougher material to mechanically protect the seal. As one example, a stack of refractory plates with RTV silicone seals at the joints between the plates can be wrapped in fiberglass tape to protect the silicone seals from abrasion. The metal frit can also be welded to the plenum, but the heat load deforms the frit. Attachment of the frit by welding does not impair carbon nanomaterial formation. Alternately, as shown in FIG. 2, the metal frit can be screwed to the plenum, using a metal support.

The presence of the thermally insulated reaction zone downstream of the burner significantly enhances the yield of carbon nanomaterials produced in the combustion systems of this invention. The presence of this zone is shown in both figures by the refractory around the volume downstream from the burner surface. The preferred length of insulated reaction zone varies proportionally to the gas velocity, with longer insulated zones preferred for higher gas velocities, but is typically within the range one to four feet. Preferably, the combination of hot gas flow rate and reaction zone length allows the combustion products to remain in the reaction zone for a residence time of at least about 1 millisecond. The higher temperature insulating material may be any refractory material, such as zirconia, alumina, and mixtures thereof. The lower temperature insulating material may contain significant amounts of silica.

The system may also be provided with one or more inlets for introducing a secondary oxidizer (e.g., air) into the system, preferably near the surfaces of the systems (e.g., the walls of the reaction zone) may be provided to mitigate soot buildup on the walls (including the refractory walls) downstream of the burner surface. In a preferred embodiment the secondary oxidizer is introduced into the system such that it flows along the refractory wall, or percolates through the refractory that forms the burner surface. Without wishing to be bound by any specific theory, it is believed that the additional oxidizer shifts the air/fuel ratio away from the ratio at which soot begins to form, creating a lean combustion zone around the reaction zone. In addition, it is believed that soot condensation on surfaces at the periphery of the reaction zone is reduced due to the heat produced by the reaction of the additional oxidizer with the fuel gas.

The combustion system also includes an ignition source. The ignition source for the burner can be any type of ignition source known in the art. In particular, the burner can be ignited using a spark. As one example, a Tesla coil can be used to form a spark between two wires. The ignition source can be placed within the reaction zone, or other igniter positions can be used. Other means for igniting a burner within a combustion system are well-known in the art and can be readily adapted without undue experimentation for use in the combustion apparatus of this invention.

In addition to the elements illustrated in FIG. 1, the combustion system of this invention will have a collection device for collecting condensables and/or soot containing carbon nanomaterial products. Volatile gases generated in the combustion system are exhausted from the system. These elements of the combustion system are not illustrated, but a variety of ways for implementing these elements are known in the art and can be applied in the systems and methods of this invention. A collection apparatus that can be cleaned in situ within a reaction system for collection of carbon nanomaterials without taking the filter off line, and in which collected products can be removed from the reaction system without interrupting synthesis is preferred. Exemplary preferred collection systems are described in U.S. patent application Ser. No. 10/098,828, filed Mar. 15, 2002. A particularly useful collection device is a filtering system in which a reverse flow of high pressure gas is applied to the downstream side of the filter to directly dislodge collected product from filter pores The entire combustion system should be operated at sub-ambient pressure to produce fullerenes and fullerenic soot in recoverable quantities. The pressure is preferably less than 200 torr but greater than 30 torr.

In the embodiment shown in FIG. 1, a 10" diameter burner with an insulated zone extending 18" downstream of the burner using a spray nozzle with a 90° spray angle (commercially available from Delavan, Inc. product No. 0.50X90A) that generates droplets with 20 micron Sauter mean diameter, it was observed that soot containing 8–9% extractable fullerenes by weight could be synthesized under the conditions of methane flow=30 SLPM, oxygen flow=60 SLPM, toluene flow=20 ml/min, and downstream chamber pressure=40 torr. This yield was also observed with methane flow=40 SLPM, oxygen flow=80 SLPM, and toluene flow=30 ml/min. It is believed that significant yield improvements can be obtained in the exemplary combustion systems by elongating the reaction zone.

In the embodiment shown in FIG. 2, a 10" diameter burner with an insulated zone extending 18" downstream of the burner using a spray nozzle with a 135° spray angle (commercially available from Spraying Systems, Co. product No. 1/8J-SS) it was observed that soot containing 9–10% extractable fullerenes by weight could be synthesized under the conditions of methane flow=30 SLPM, burner oxygen flow=40 SLPM, toluene flow=42 ml/min, nozzle oxygen flow=45 SLPM, and downstream chamber pressure=40 torr. This yield was also observed with methane flow=30 SLPM, burner oxygen flow=60 SLPM, toluene flow=61 ml/min, and nozzle oxygen flow=45 SLPM using a version of the nozzle that where the liquid cap was replaced with one where the holes for liquid flow had half of the area of the original. It is believed that significant yield improvements can be obtained in the exemplary combustion systems by elongating the reaction zone.

Also in the embodiment shown in FIG. 2, a 10" diameter burner with an insulated zone extending 18" downstream of the burner using a spray nozzle with a 135° spray angle (commercially available from Spraying Systems, Co. product No. 1/8J-SS) it was observed that soot containing 8% extractable fullerenes by weight could be synthesized under the conditions of methane flow=18 SLPM, burner oxygen flow=40 SLPM, coal tar distillate (indene fraction) flow=45 ml/min, nozzle oxygen flow=48 SLPM, and downstream chamber pressure=40 torr using a version of the nozzle that where the liquid cap was replaced with one where the holes for liquid flow had half of the area of the original. The sooting rate for these conditions was approximately 100 g/hour, for a carbon conversion percentage of 0.36% (C in coal tar distillate to C in fullerenes). It is believed that significant yield improvements can be obtained in the exemplary combustion systems by elongating the reaction zone, using a different fraction of coal tar distillate, and/or varying the operating conditions further.

The sprayed fuel employed in the combustion methods of this invention is any hydrocarbon, fossil fuel, biomass fuel or products derived from them. In a preferred embodiment, the fuel contains polynuclear aromatic hydrocarbons (PAHs), as described U.S. patent application Ser. No. 10/098,829, filed Mar. 15, 2002. The liquid spray of the invention enables the use of low vapor pressure high PAH-rich feedstocks such as coal tar distillates and petroleum solvent naphtha distillates.

The oxidizer is an oxygen-containing gas and is preferably oxygen. Air is also suitable, but the nitrogen in the oxidizing gas implies a lower carbon nanomaterial production rate per pumping rate in the apparatus. If the fuel requires heating to prevent condensation within the burner, the oxidizer supply line and burner inlet can also be heated to prevent condensation of the fuel when it mixes with the oxidizer. Additional oxidizer can be added to the flame downstream of the burner plate, preventing soot buildup on the porous refractory and/or the parts of the combustion apparatus surrounding the burner flame. The oxidizer added to fuel in the burner, the nozzle, and the secondary oxidizer provided into the combustion apparatus may be the same or different.

One or more diluent gases may be introduced into the burner or into the combustion apparatus in the peripheral oxidizer supply. The diluent gas can also be added through an "air-atomizing" type nozzle as shown in FIG. 2, where the diluent may be used to affect the spray characteristics without becoming another source of oxidizing gas. Nitrogen is a preferred diluent gas.

One or more catalysts may be introduced into the liquid spray. Iron, cobalt, and nickel are all known to catalyze the formation of carbon nanotubes from carbon and hydrocarbon vapors. Iron, nickel or cobalt can be introduced into the flame by dissolving their organometallic compounds into the liquid fuel feed.

In one embodiment, the invention provides a combustion apparatus for carbon nanomaterial production comprising: at least one burner having a plenum, a spray nozzle for liquid fuel feed, and porous refractory to thermally separate the flame from the uncombusted gases; an ignition source for said burner; a reduced pressure chamber capable of providing reduced pressure downstream of said burner; a system for collecting the carbon nanomaterials produced; and a means for creating vacuum.

In another embodiment, the combustion apparatus supplies additional oxidizer into the combustion apparatus adjacent to the walls of the combustion apparatus to decrease or prevent soot deposition at the walls. The oxidizer gas can be provided at or near the periphery of the final porous refractory plate of the burner as discussed above. However, the additional oxidizer may be provided by one or more gas inlets in the combustion apparatus, with the inlet or inlets positioned so that the oxidizer gas passes adjacent to the walls of the combustion apparatus downstream of the burner. The secondary oxidizer gas does not have to flow through the burner structure or be a part of the burner structure.

After exiting the heated zone, the combusted gas can be allowed to cool radiatively to about 600° C. prior to collection. This is most simply done by allowing the gas to flow (and cool) for some distance in a non-insulated conduit. The conduit could be cooled radiatively, by natural convection, or by a heat exchanger. Various means are known in the art for providing cooling of a flowing gas below a selected temperature and these various means can be readily adapted for use in the combustion apparatus of this invention.

The reduced pressure chamber allows sub-atmospheric pressures to be maintained downstream of the porous refractory burner plate. The reduced pressure chamber may completely enclose the burner. Pressures downstream of the burner plate are preferably between about 20 and 200 torr, more preferably between about 30 and 70 torr. Because the burner surface is porous and in fluid communication with the reduced pressure chamber, the pressure inside the burner is generally below atmospheric pressure. Since the mixing and flow distribution elements of the burner can cause pressure drops along the length of the burner, the pressure in the burner can vary with axial position along the burner.

The system for collecting the carbon nanomaterials employs a collector such as a nonporous surface or a porous filter to collect the carbon nanomaterials. The carbon nanomaterials, including fullerenes and fullerenic soot, are collected as condensable products of combustion. Condensable products contain soot, fullerenic soot and fullerenes including products of combustion which may have rearranged or condensed with other combustion products in the heated zone. Condensable products may also contain polynuclear aromatic hydrocarbons, from the fuel or which are generated on combustion. As discussed briefly herein the presence of PAHs in fullerenes and fullerenic soot is not desirable and PAHs are preferably removed from isolated fullerenes or fullerenic soot. Condensables are any products of combustion (or remnants of hydrocarbon fuel) released at the burner which can be collected on a collector or on a filter. Condensables are distinguished from gaseous products, such as CO or CO2, which may be released by the burner and from volatile components such as benzene, toluene, etc. A preferred system for carbon nanomaterial collection is pulse jet-cleaned filter bag device described in U.S. application Ser. No. 10/098,828, filed Mar. 15, 2002.

Other means for collection and removal of combustion products from a combustion system are known in the art and can be readily adapted for use in the combustion apparatus of this invention. Other means for applying motive force and/or gas flow to a filter to clean the filter are known in the art and can be readily adapted for use in the combustion apparatus of this invention.

In the preferred embodiment of soot collection by filter bag, the pressure in the chamber would tend to increase as the bag is filled with soot. To maintain a constant pressure near the burner, a pressure controller throttle valve located between the pump and the bag is throttled in response to fluctuations in pressure in the chamber containing the burner. The valve is opened further as the bag becomes covered with soot.

A heat exchanger can be used to cool the gas to at least the operating temperature of the pump(s), greatly increasing the pumping efficiency. Placement of a heat exchanger after the collection unit minimizes fouling of the heat exchanger.

Typically, the reduced pressure chamber is connected to one or more vacuum pumps. Any type of vacuum pump known in the art that is capable of attaining the specified pressure and gas flows may be used. The pump may be a rotary piston type, a liquid ring type, roots blower, etc. Alternatively, vacuum may be provided by steam ejectors. The reduced pressure chamber can have gas inlets, sampling ports, methods for cooling the gas downstream of the burner, pressure and temperature sensing elements, and windows. The reduced pressure chamber can also have interior or exterior insulation, interior or exterior water jackets and/or interior or exterior cooling elements to aid in temperature control within the chamber or the burner (if the burner is contained within the chamber).

The combustion apparatus may incorporate a single burner or multiple burners. A combustion apparatus with multiple burners can be made by setting several burners together within a system housing. Alternatively, a different burner shape, such as hexagonal or square, can be selected to facilitate close packing of multiple burners in a combustion system.

The invention also provides methods for synthesis of carbon nanomaterials including fullerenes and fullerenic soot employing a liquid spray into a flame in combination with the various apparatus and device elements described herein. In particular, the methods of this invention employ a burner with a porous refractory surface to provide for the sooting flame and to improve the synthesis of carbon nanomaterials and provide a reaction zone at temperatures above about 1000° C. upstream of the sooting flame.

In a specific embodiment, the invention provides a method for making carbon nanomaterials comprising the steps of:
    providing a flame and
    contacting droplets of a hydrocarbon feedstock in a chamber under conditions effective to produce macroscopic amounts of carbon nanomaterials, particularly fullerenes or fullerenic soot; and
    collecting the resulting condensable products of combustion which contain carbon nanomaterials, particularly fullerenes and fullerenic soot.

In a more specific embodiments, the invention provides a method for making carbon nanomaterials comprising the steps of:
    providing a burner having a porous refractory surface and a liquid hydrocarbon spray;
    using the burner to establish a flame contacting droplets of the sprayed hydrocarbon feedstock in a chamber under conditions effective to produce macroscopic amounts of carbon nanomaterials,;
    collecting the resulting condensable products of combustion, the condensables containing carbon nanomaterials; and
    recovering the carbon nanomaterials from the condensables.

In preferred embodiments, the combustion chamber is at a pressure less than atmospheric, the flame is sustained by a hydrocarbon and an oxidant, and a liquid hydrocarbon is sprayed into the flame.

The invention also provides a method for making carbon nanomaterials comprising:

providing an oxygen-containing gas stream and a hydrocarbon gas stream;

mixing the streams together and igniting the mixed gases to establish a flame;

spraying a liquid hydrocarbon feedstock into the flame to generate a sooting flame;

collecting condensables produced by the sooting flame; and recovering the carbon nanomaterials, particularly fullerenes and fullerenic soot, from the condensables.

More specifically, the mixed oxygen-containing gas and hydrocarbon gas can be distributed cross a burner surface, e.g., a porous refractory surface.

In preferred embodiments, the combustion chamber is at a pressure less than atmospheric and the sprayed hydrocarbon fuel contains aromatic species.

The methods of the invention may additionally comprise the step of providing a reaction zone downstream of the porous refractory plate at temperatures equal to or greater than 1000° C. This improvement can be provided by an insulating reaction zone and is suitable for all combustion apparatus and methods described herein.

The methods of the invention may also additionally comprise the step of adding additional oxidizer at or near the ignition point to prevent soot buildup on the porous refractory plate and any gas flow path insulation present. The additional oxidizer can also mitigate heat loss from the carbon nanomaterial forming flame to the surroundings. This improvement is suitable for use with any burner that has a downstream insulated section.

The methods of the invention may also additionally comprise the step of adding additional gas, which may be an oxidizing gas, through the nozzle to improve the liquid spray characteristics. This additional gas allows for improved control of droplet size and time-temperature history. Nozzle designs that incorporate gas as well as liquid flows are well-known in the art. This kind of nozzle is suitable for use with any of the burner designs considered.

Although FIGS. 1 and 2 illustrate burners with vertically upflowing gases, other burner orientations, such as those having gases vertically downflowing or flowing horizontally, can be employed if appropriate support and or retention of the porous refractory is provided. In particular, if the burner is oriented so that the porous refractory is below the plenum, gravitational effects will help to reduce soot deposition on the porous refractory during combustion.

In general, methods for recovering fullerenes from combustion formed condensables involve extraction in solvents such as toluene or xylene to recover lower molecular weight "solvent extractable fullerenes". Any art known methods for the purification of fullerenes, fullerenic soot and other carbon nanomaterials can be employed. Undesired PAHs can, for example, be removed from collected combustion products by extraction (repeated or continuous) or washing with a solvent in which the PAHs are substantially soluble but in which carbon nanomaterials, particularly fullerenes, are not substantially soluble. Solvents that can be used for such purification include alcohols, diols, glycols, ethers, aldehydes, ketones, alkanes, substituted alkanes, e.g., haloalkanes, nitroalkanes and alkyl nitrites and azeotropes thereof as reported in U.S. patent application Ser. No. 10/233,010, filed Aug. 30, 2002.

Those of ordinary skill in the art will appreciate the existence of equivalents of device elements, method steps, and materials, all known functional equivalents of which are encompassed by the invention. All references cited herein are hereby incorporated by reference to the extent not inconsistent with the disclosure herewith.

We claim:

1. A method for making carbon nanomaterials which comprises the steps of:
    a) establishing a flame from a flow of oxygen-containing gas and a hydrocarbon fuel; and
    b) introducing droplets of liquid hydrocarbon feedstock into the flame to thereby generate carbon nanomaterials in a combustion system maintained at a pressure less than 200 torr; and
    c) collecting the carbon nanomaterials formed.

2. The method of claim 1 wherein the flame is established at a burner surface.

3. The method of claim 1 wherein the liquid hydrocarbon feedstock is a coal tar distillate or a petroleum distillate.

4. The method of claim 1 wherein the pressure in the combustion system is maintained between about 200 torr and about 20 torr.

5. The method of claim 2 wherein the burner surface comprises a porous refractory material.

6. The method of claim 5 wherein the porous refractory material is a porous refractory plate.

7. The method of claim 5 wherein the porous refractory material comprises refractory particles.

8. The method of claim 2 wherein the burner further comprises a plenum.

9. The method of claim 8 wherein the burner plenum is in thermal contact with a liquid to provide temperature control of the plenum.

10. The method of claim 8 further comprising a porous refractory material between the plenum and the burner surface.

11. The method claim 10 wherein the burner plenum is separated from the porous refractory by a porous metal frit.

12. The method of claim 1 further comprising the step of providing a reaction zone upstream of the flame which is thermally insulated to retain heat from the flame and such that liquid hydrocarbon feedstock or products generated from the feedstock are held at or above about 1000° C. for a residence time of at least about 1 millisecond.

13. The method of claim 12 wherein droplets are introduced into the flame or the reaction zone employing a droplet delivery apparatus comprising one or more spray nozzles.

14. The method of claim 13 wherein the liquid hydrocarbon is mixed with a gas in the spray nozzle.

15. The method of claim 14 wherein the gas is oxygen-containing gas.

16. The method of claim 13 wherein the sprayed droplets have a Sauter mean diameter of 40 microns or less.

17. The method of claim 13 wherein the spray nozzle used to inject the liquid hydrocarbon feedstock has a spray angle of 90 degrees or more.

18. The method of claim 1 wherein the liquid hydrocarbon feedstock comprises 30% by weight or more of polynuclear aromatic hydrocarbon.

19. The method of claim 1 wherein the hydrocarbon fuel gas is methane or natural gas.

20. The method of claim 1 wherein the flame is non-sooting until the addition of the liquid hydrocarbon droplets.

21. The method of claim 1 for producing fullerenes, fullerenic soot or both.

* * * * *